2,922,117

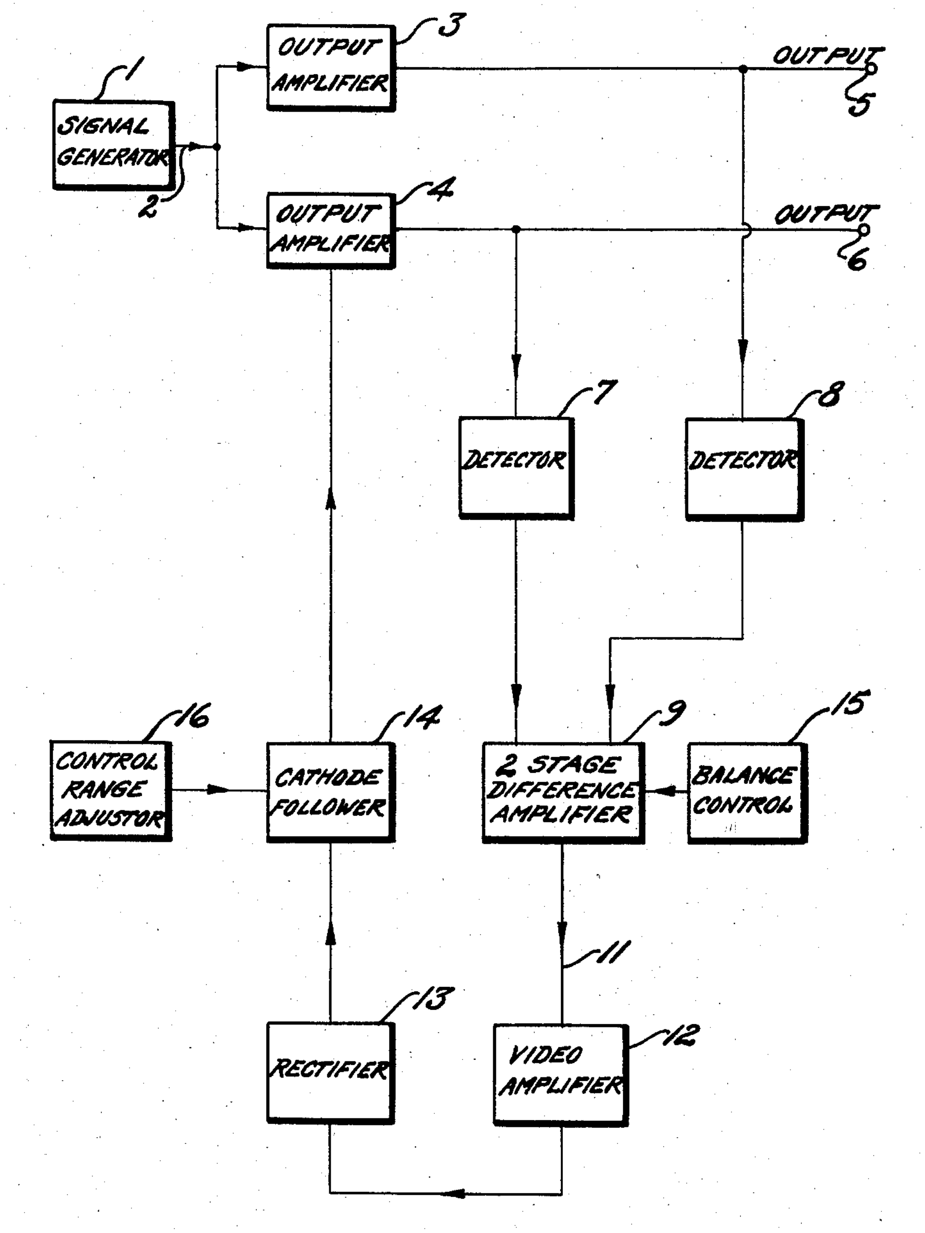
INVENTORS
IAN A. HOOD
AND PIO H. DALLAMURA
BY Wade Koontz
George Fine Jr.
ATTORNEYS United States Patent Office 2,922,117
Patented Jan. 19, 1960

CONTROL OF MULTIPLE PULSE SIGNALS

Ian A. Hood, San Diego, Calif., and Pio H. Dalle Mura, Baltimore, Md., assignors, by mesne assignments, to the United States of America as represented by the Secretary of the Air Force Application August 30, 1957, Serial No. 681,423
7 Claims. (Cl. 330—124)

This invention relates to control circuits and more particularly to an automatic control circuit for multiple electrical signals.

More specifically, in a multiple output system comprising multiple output amplifiers having separate output and a common input, the output signal from any one of the amplifiers may be selected as a master signal and compared to any one of the other output signals, such output signal being referred to as the slave. An error correction signal is derived as a result of the comparison which is then utilized to gain control of the slave signal amplifier. The slave signal amplifier may be then controlled by the error correction signal so that its output signal is equal in amplitude to that of the master signal. Any electrical variations in the master and slave amplifiers which may cause variations in the signal output are minimized so that the slave signal and the master signal as compared to each other are highly stable and equal. The difference in relative outputs is much less than 1% despite possible changes in circuit conditions of the master and slave amplifiers which could normally cause 20% difference in relative output levels if the automatic control was not utilized.

If it is considered desirable, the gain of the amplifier may be preselected and then controlled by the error correction signal so that the output signals of the master amplifier and the slave amplifier is at some fixed ratio.

In one embodiment of this invention, a pulsed R.F. signal generator is provided with a pair of output amplifiers having a common input and separate outputs. The resulting pair of amplified R.F. signals are detected and fed into a difference amplifier from which is derived an error correction signal. The error correction signal is video amplified and rectified, then fed to one of the said pair of output amplifiers as a gain control voltage.

An expression relating the change in relative output with automatic control to that without control is given assuming a linear relationship between control voltage and controlled amplifier gain. It is $$\Delta V_{out} \text{ (with control)} = \Delta V_{out} \text{ (without control)} \times \left\{ \frac{V_G = E_{in}(G_1 - G_2) \times \delta \times A}{V_G} \right\}$$

where $V_G$=controlled output amplifier operating bias without control $E_{in}(G_1-G_2)$=difference in output voltage of the two output amplifiers $\delta$="efficiency" of the detector and rectifier circuits in the control section $A$=gain of difference and video amplifier in control section Using the above expression and giving values to the constants determined by circuit requirements, it is possible to obtain a 20 to 1 improvement in relative output stability with a gain in the difference and video amplifiers in the control section of approximately 150 times.

An object of the invention, therefore, is to provide an automatic control system for multiple signals.

Another object of the invention is to provide an automatic control system for multiple signals by utilizing a pair of said signals to derive an error correction signal which controls one of the signals of said pair.

A still further object of the invention is to provide an automatic control system for a single one of a pair of amplifiers.

Another object of this invention is to provide a pair of amplifiers having equal amplitude outputs that are highly stable.

These and other objects and features will be better understood from the detailed description made with reference to the accompanying drawing in which the single figure is a block diagram of the control system for a pair of amplifiers.

In the figure, a pulsed R.F. signal is provided by signal generator 1. This signal is fed to the pair of output amplifiers 3 and 4 by way of line 2. Amplifiers 3 and 4 feed low impedance outputs 5 and 6 across which are connected a pair of detectors 7 and 8, respectively. From detectors 7 and 8 are obtained video pulses corresponding to the modulation envelope of the pulsed R.F. outputs from amplifiers 3 and 4. These are fed into two-stage difference amplifier 9 which gives at its output 11 a video difference pulse. This pulse is fed through video amplifier 12 into double rectifier 13. The inputs of these rectifiers are connected in parallel, the outputs in series, so that the D.C. control voltages of the same polarity as the video difference pulses are produced at the output. The output of double rectifier 13 is a voltage utilized for control purposes and it is fed through impedance-transforming, direct-coupled cathode follower 14 to one of the grid circuits of amplifier 4, thereby controlling the gain of amplifier 4.

Two-stage difference amplifier 9 is provided with balance control 15 and cathode follower 14 utilizes control range adjustment 16 which normally controls the operating bias so that cathode follower 14 can be initially adjusted to operate approximately at the center of its control range.

While in accordance with the provisions of the statute, we have illustrated and described the best form of the invention now known to us, it will be apparent to those skilled in the art that changes may be made in the form of the system disclosed without departing from the spirit of the invention as set forth in the appended claims, and that in some cases certain features of the invention may be sometimes used to advantage without a corresponding use of other features.

What is claimed is:

1. In a signal generating system adapted to supply pulse signals to a pair of signal transmission lines, means for maintaining precise equality of R.F. pulse magnitude in said pair of transmission lines, comprising a pulsed signal generator, a pair of pulse amplifiers having a common input signal from said pulsed signal generator and having separate output signals, one of said amplifiers adapted to being gain-controlled, a pair of means to detect the separate amplified pulse signals, differential amplifying means to compare said detected signals to derive their difference value, means to rectify said difference signal, impedance matching means connected between said rectifier means and said gain-controlled amplifier, and means to apply said rectified difference signal to said gain-controlled amplifier to establish its pulse output signal at precisely the same amplitude as that of the other of said pair of amplifiers.

2. In a signal generating system adapted to supply pulse signals to a pair of signal transmission lines, means for maintaining precise equality of R.F. pulse magnitude in said pair of transmission lines comprising a signal generator, a pair of amplifiers adapted to receive the output signal from said signal generator, one of said amplifiers being gain-controlled, a pair of means to detect the separate amplified signals, differential amplifying means to compare said detected signals to each other to derive their difference value, means to rectify said difference signal, video amplifying means for said difference signal, impedance matching means connected between said rectifier means and said gain-controlled amplifier, and means to apply said video amplified difference signal to said gain-controlled amplifier to establish its output pulse signal at precisely the same amplitude as that of the other of said pair of amplifiers.

3. In a signal generating system adapted to supply pulse signals to a pair of signal transmission lines, means for maintaining precise equality of R.F. pulse magnitude in said pair of transmission lines; comprising a pulsed signal generator, a pair of pulse amplifiers having a common input signal from said pulsed signal generator and having separate output signals, one of said amplifiers adapted to being gain-controlled, a pair of detectors, each of which is adapted to receive an amplified pulse from its corresponding amplifier of said pair of amplifiers, differential amplifying means to compare said detected pulsed signals to derive their difference value, means to video amplify said difference signal, means to rectify said video amplified signal, impedance matching means connected between said rectifier means and said gain-controlled amplifier, and means to apply said rectified signal to said gain-controlled amplifier to establish its output pulse signal at precisely the same amplitude as that of the other of said pair of amplifiers.

4. In a signal generating system adapted to supply pulse signals to a pair of signal transmission lines, means for maintaining precise equality of R.F. pulse magnitude in said pair of transmission lines, comprising a pulsed signal generator, a pair of pulse amplifiers, one being gain-controlled and the other uncontrolled, said pulse amplifiers having a common input signal provided by said pulse generator, and having separate amplified pulse output signals, means to establish the pulse output signal from said uncontrolled pulse amplifier as a reference signal, said means including a detector for each of said amplified output signals, a differential amplifier adapted to receive said pair of detected signals, a video amplifier adapted to receive the output of said differential amplifier, a rectifier for said video amplifier signal, an impedance matching device connected between said video amplifier and said gain-controlled amplifier, and means to apply said rectified signal to said gain-controlled amplifier to establish its output pulse signal at precisely the same amplitude as that of said reference signal.

5. In a signal generating system adapted to supply pulse signals to multiple signal branches, means for maintaining precise equality of signal output in said multiple branches of the R.F. pulsed system, comprising a signal generator, multiple R.F. pulse amplifiers, only one of said amplifiers being uncontrolled, all the other of said amplifiers being gain-controlled, said amplifiers having a common input signal provided by said signal generator and each of said amplifiers having separate amplified output signals, means to establish the output R.F. pulse signal from said uncontrolled amplifier as a reference signal, said means including a detector for each of said amplified output signals, a differential amplifier for each of said gain-controlled amplifiers, each of said differential amplifiers adapted to receive a signal from the output of said uncontrolled amplifier and a signal from the output of its corresponding gain-controlled amplifier, a video amplifier adapted to receive the output of each of said differential amplifiers, a rectifier adapted to receive the video signal from each of said video amplifiers, an impedance matching device connected between each of said rectifiers and each of said gain-controlled amplifiers, and means to apply each of said rectified signals to each of said gain-controlled amplifiers to establish the output signals of said gain-controlled amplifiers at precisely the same amplitude as that of said reference signal.

6. In a signal generating system adapted to supply R.F. pulse signals to a pair of signal transmission lines, means for maintaining precise equality of R.F. signal pulse magnitude in said pair of transmission lines comprising an R.F. pulse signal generator, a pair of R.F. pulse amplifiers, one being gain-controlled and the other uncontrolled, said amplifiers having a common input signal provided by said signal generator and separate R.F. pulse amplified output signals, means to establish said output signal from said uncontrolled amplifier as a reference voltage, means for utilizing said reference voltage to control the energy feedback to said gain-controlled amplifier so that the signal output of said gain-controlled amplifier is precisely equal in amplitude to said reference voltage, said control means including a detector for each of said amplified output signals, a differential amplifier adapted to receive said pair of detected signals, a video amplifier adapted to receive the output of said differential amplifier, a rectifier for said video amplified signal, an impedance matching device connected between said video amplifier and said gain-controlled amplifier.

7. In an automatic multiple pulse signal control system, a pair of R.F. pulse amplifiers adapted to receive a common R.F. pulse input signal, means to detect the separate pulse output signals from said pair of amplifiers, means including a difference amplifier to compare said separate detected pulse output signals to derive an error correction signal, means to rectify said compared signal, and means to apply said rectified signal to one of said pair of amplifiers to correct any inequality of output signal magnitude as between said pair of amplifiers.

References Cited in the file of this patent

UNITED STATES PATENTS

| | | |
|---|---|---|
| 2,284,102 | Rosencrans | May 26, 1942 |
| 2,369,066 | Maxwell | Feb. 6, 1945 |
| 2,438,526 | Waterman | Mar. 30, 1948 |
| 2,491,918 | De Boer et al. | Dec. 20, 1949 |
| 2,587,995 | Griggs | Mar. 4, 1952 |
| 2,711,531 | Murdock | June 21, 1955 |
| 2,723,387 | Slavin | Nov. 8, 1955 |
| 2,781,423 | Kuczun et al. | Feb. 12, 1957 |